March 25, 1947.  N. P. W. FRISK  2,417,923
THERMOPILE FOR MEASURING AIR TEMPERATURE
Filed May 26, 1943  2 Sheets-Sheet 1
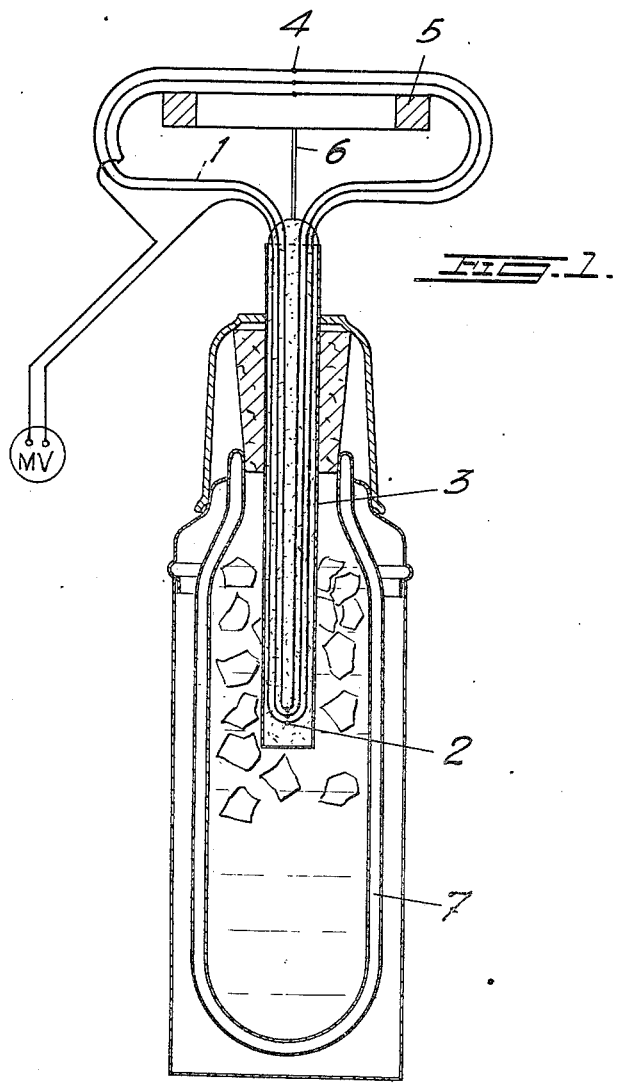
Inventor
Nils P. W. Frisk,
by Sommers & Young
Attorneys March 25, 1947.　　　N. P. W. FRISK　　　2,417,923
THERMOPILE FOR MEASURING AIR TEMPERATURE
Filed May 26, 1943　　　2 Sheets-Sheet 2
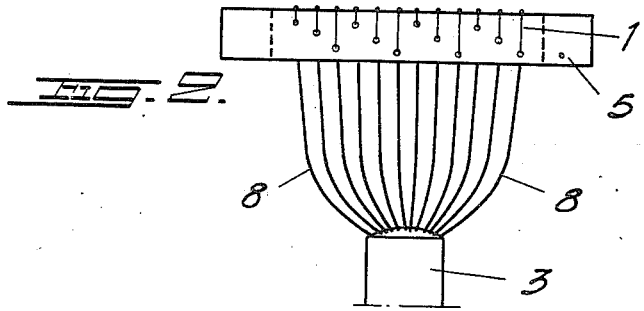
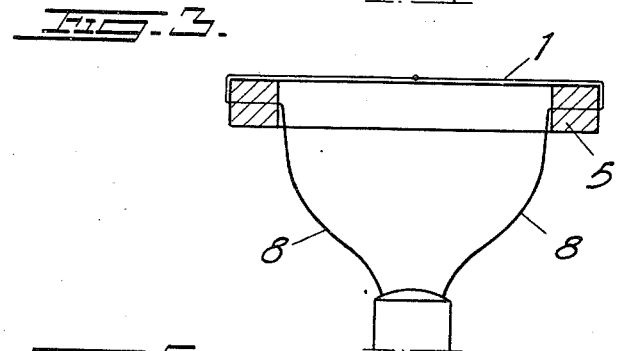
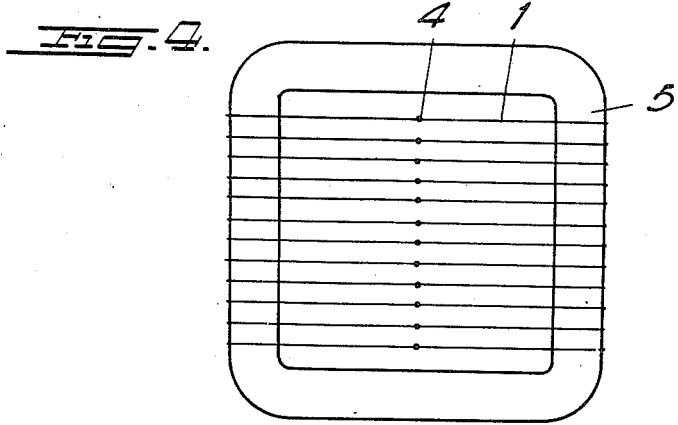
Inventor
Nils P. W. Frisk,
by Sommers & Young
Attorneys Patented Mar. 25, 1947

2,417,923

UNITED STATES PATENT OFFICE 2,417,923

THERMOPILE FOR MEASURING AIR TEMPERATURE

Nils Pontus Wilhelm Frisk, Stockholm, Sweden, assignor, by mesne assignments, to Telefon Aktiebolaget L. M. Ericsson, Midsommarkransen, near Stockholm, Sweden Application May 26, 1943, Serial No. 488,589
In Sweden November 19, 1941

5 Claims. (Cl. 136—4)

This invention relates to temperature measuring devices, and has for an object to eliminate to a high degree the well-known inaccuracies which occur in ordinary mercury thermometers. To this end the measuring instrument consists of a thermo-couple having a plurality of elements connected in series in which the soldered junctions acting as measuring junctions are provided on fine-drawn wires stretched over a frame, whereas the opposite, that is to say the cold, junctions are placed in a vacuum flask containing a comparison medium which is formed as a handle for the device. Preferably, the said wires extend parallel to each other in the same plane. The diameter of the wires should be as small as possible, inasmuch as the heat transfer between a wire and the surrounding medium or surfaces will be the more rapid the smaller is the diameter of the wire, the heat transmission capacity of the wire being proportional to the diameter thereof, whereas the mass of heat is proportional to the square of the diameter of the wire. In case of small diameters it has proved too that the heat transmission between the wire and the surrounding air is effected, substantially by conduction. As a result of the invention an electromotive force is obtained in the thermo-couple which represents the proper temperature of the air much more exactly than what can be done by other types of thermometer.

Due to the great relation between the heat transmission to the wire and the heat mass thereof the device is caused to react still more rapidly. Instead of the decimal time of the usual thermometer which amounts to 10 minutes, the device according to this invention has a decimal time of a few seconds only. This is of a great importance in respect of temperature measurements in the air, as the measurement may be made practically instantaneously, the additional advantage being gained that all measurements may be effected by one and the same instrument, the correction of which will thus exert the same influence on all measuring results.

The placing of the wires with their measuring junctions in a plane allows measuring of the temperature of a rather plane surface to be readily made by simply pressing the bundle of wires against said surface.

In the accompanying drawings, Fig. 1 is a diagrammatic longitudinal section of an instrument constructed according to this invention. Fig. 2 is a side elevation of a preferred embodiment of the bundle of wires and its supporting means. Fig. 3 is a section of said supporting means and the bundle of wires carried thereby. Fig. 4 is a plan view of the bundle of wires and its supporting device. Fig. 5 illustrates a modified embodiment of the bundle of wires.

The instrument shown consists of a thermo-couple comprising a plurality of pairs of fine-drawn wires 1, preferably of iron-constantan or copper-constantan, the cold junctions of which 2 are placed in the lowermost portion of a closed-bottom-tube 3, of metal or glass or the like, which is filled with an electrically insulating but sufficiently heat conducting material. The hot junctions 4 are situated in the open air, approximately midway between two opposite sides of a square-shaped or rectangular frame 5, of impregnated wood or Bakelite or other suitable insulating material, over which the wires 1 are stretched in parallel. Said frame 5 is shown in Fig. 1 as connected to the upper end of the tube 3 by means of a stay or stays 6. The tube 3 is immersed in a vacuum flask 7 filled with a mixture of ice-pieces and water. By this means the junctions 2 may be maintained at a temperature of 0° C. in a simple way. Owing to the great melting heat of ice a vacuum flask of usual size will be sufficient, the capacity of such a vacuum flask being so large as not to require filling more frequently than once a day.

In order to avoid certain difficulties inherent to the use of the very small-sized wires (having a diameter of 0.1 mm. or thereabout) members of a larger size may be used to connect the measuring wires stretched over the frame 5 to the wires placed in the tube 3, that is to say, the reference wires. In Figs. 2 and 3 such connecting members are shown as thicker wires 8. In this case the measuring wires 1 stretched over the frame 5 are put from the outside of the respective frame members through holes in said members and connected, at the inside of the frame members, to individual connecting wires 8 leading to the corresponding reference wires as placed in the tube 3. The thick connecting wires 8 also act as a mechanical connection between the tube 3 and the frame 5. The use of such connecting wires does not affect the results as long as all of the soldered junctions between the connecting wires and the measuring wires have the same temperature and likewise all of the soldered junctions between the connecting wires and the reference wires have one and the same temperature. The former temperature agrees substantially with that of the air and the latter one agrees substantially with the temperature prevailing inside the vacuum flask. For the elements 8 applicant prefers to use thermo-elements of iron-constantan or copper-constantan; principally, however, also other appropriate thermo-elements may be employed. The descending wires 8 may be made, in pairs from iron and constantan.

Certain other modifications may also be made within the scope of the invention without affecting the efficiency or accuracy of the instrument. For instance, in order to obtain the reference temperature, water may be used instead of ice. In such a case the temperature of the water may be measured by means of a usual mercury thermometer. This can be done without any essential inconvenience, since the mercury thermometer responds much more quickly in water than it does in air. Besides, the variations of temperature in water take place so slowly as not to involve trouble to the correction. The correction is further facilitated by the fact that the millivoltmeter used to indicate the temperature, which may be inserted in the circuit of the thermo-couple as diagrammatically shown in Fig. 1, where it is marked by the indicia "MV," is provided with a movable temperature scale so that it may be adjusted to allow the instrument to show the temperature read off on the mercury thermometer. After that, the thermometer can be used without further trouble in the way above set forth.

Another modification involves the provision of double measuring wires instead of single ones. In such case the soldered junctions should be replaced by contact joints 4 obtained, for instance, by joining the wires like the links of a chain, as shown in Fig. 5, where the wires of each pair of measuring wires are designated by the numerals $1^1$ and $1^2$, respectively.

What I claim is:

1. In a thermo-electric temperature measuring device, the combination with a vacuum flask for receiving a non-gaseous reference medium for maintaining a constant temperature inside the flask, a closed-bottomed tube extending into said flask, a gas-tight seal between the tube and mouth of the flask, a flat frame connected to the exposed outer end of said tube, said frame extending in a plane forming an angle with the axis of said tube, pairs of small-sized filaments of dissimilar material, said pairs of filaments extending into said tube and having soldered junctions near the bottom thereof, said pairs of filaments also being stretched over the surface of said frame remote from the vacuum flask and having other soldered junctions in the middle thereof, so as to form thermo-couples for connection to an electric measuring instrument.

2. A device as claimed in claim 1, and in which said vacuum flask is inserted into a casing shaped as a handle for the device.

3. A device as claimed in claim 1, and in which the surface of the frame remote from the vacuum flask forms a right angle with the axis of the tube, and in which the portions of the filaments situated in said surface are parallel to each other.

4. A device as claimed in claim 1, and in which the frame is supported by exposed portions of said filaments, said exposed portions being heavier in thickness than the portions of the filaments contained in said receptacle and those supported by the frame.

5. A device as claimed in claim 1, and wherein the portions of said filaments supported by the frame are double and are linked together so as to form contact joints to act as measuring points.

NILS PONTUS WILHELM FRISK.

REFERENCES CITED

The following references are of record in the file of this patent:

UNITED STATES PATENTS

| Number | Name | Date |
|---|---|---|
| 1,818,221 | Huber | Aug. 11, 1931 |
| 2,126,656 | Pack | Aug. 9, 1938 |
| 1,752,117 | Smith | Mar. 25, 1930 |
| 1,977,340 | King | Oct. 16, 1934 |
| 2,022,515 | Orchard | Nov. 26, 1935 |
| 1,942,516 | Noyes, Jr. | Jan. 9, 1934 |
| 2,012,112 | States | Aug. 20, 1935 |
| 1,103,640 | Wilson | July 14, 1914 |
| 2,111,677 | Robinson | Mar. 22, 1938 |
| 2,161,370 | Mears | June 6, 1939 |
| 2,285,457 | Obermaier | June 9, 1942 |

OTHER REFERENCES

Barr, et al. Ind. & Eng. Chemistry, Anal. Ed., vol. 8 (1936), pp. 393–395. Page 393 relied on. (Copy in Div. 59.)

Roeser, "Thermoelectric Thermometry" (1940), page 389. (Copy in Div. 60.)

Page S-67 of March, 1939, issue of "Journal of The Institute of Fuel."